(12) United States Patent
Stroeh et al.

(10) Patent No.: US 10,621,567 B2
(45) Date of Patent: Apr. 14, 2020

(54) ELECTRONIC GRACE PERIOD BILLING

(71) Applicant: MasterCard International Incorporated, Purchase, NY (US)

(72) Inventors: Antonia Stroeh, Stamford, CT (US); John Doherty, Brooklyn, NY (US); Alexis Suberville, Brooklyn, NY (US); Holliday Haynes, Freeport, NY (US); Stephen Parento, White Plains, NY (US); Wayne Molitor, O'Fallon, MO (US); Peter J. Flor, O'Fallon, MO (US)

(73) Assignee: MASTERCARD INTERNATIONAL INCORPORATION, Purchase, NY (US)

( * ) Notice: Subject to any disclaimer, the term of this patent is extended or adjusted under 35 U.S.C. 154(b) by 1065 days.

(21) Appl. No.: 14/789,482

(22) Filed: Jul. 1, 2015

(65) Prior Publication Data
US 2017/0004467 A1    Jan. 5, 2017

(51) Int. Cl.
G06Q 20/00    (2012.01)
G06Q 20/14    (2012.01)
G06Q 20/40    (2012.01)
G06Q 20/02    (2012.01)

(52) U.S. Cl.
CPC .......... *G06Q 20/14* (2013.01); *G06Q 20/027* (2013.01); *G06Q 20/405* (2013.01)

(58) Field of Classification Search
CPC ...................................................... G06Q 20/14
USPC ......................................................... 705/40
See application file for complete search history.

(56) References Cited

U.S. PATENT DOCUMENTS

| | | | |
|---|---|---|---|
| 5,699,528 A | 12/1997 | Hogan | |
| 5,943,656 A | 8/1999 | Crooks et al. | |
| 6,636,833 B1 | 10/2003 | Flitcroft et al. | |
| 6,757,371 B2 | 6/2004 | Kim et al. | |
| 7,136,835 B1 | 11/2006 | Flitcroft et al. | |
| 7,577,610 B2 | 8/2009 | Miyuki | |

(Continued)

FOREIGN PATENT DOCUMENTS

| | | |
|---|---|---|
| JP | 2002-183445 A | 6/2002 |
| JP | 2004-145397 A | 5/2004 |
| WO | 2013/122912 A1 | 8/2013 |

OTHER PUBLICATIONS

What is a Grace Period (Year: 2017).*

(Continued)

*Primary Examiner* — Bruce I Ebersman
(74) *Attorney, Agent, or Firm* — Otterstedt, Wallace & Kammer, LLP

(57) ABSTRACT

An authorization request for a payment transaction is obtained, from a given one of a plurality of billers, over a payment network having a standard clearing and settlement time period. Via the payment network, a special IOU approval authorization request response to the authorization request for the payment transaction is passed, indicating that the given one of the plurality of billers will be paid in connection with the payment transaction after expiration of a grace period from a time of the authorization request, regardless of whether funds are available for an account associated with the payment transaction. The grace period is longer than the standard clearing and settlement time period. The payment transaction is not settled until expiration of the grace period.

4 Claims, 9 Drawing Sheets

(56) References Cited

U.S. PATENT DOCUMENTS

| | | | |
|---|---|---|---|
| 7,958,049 B2 | 6/2011 | Jamison et al. | |
| 8,417,628 B2 | 4/2013 | Poplawski et al. | |
| 8,533,079 B2 | 9/2013 | Sharma | |
| 8,595,134 B2 | 11/2013 | Kelly et al. | |
| 8,630,949 B2 | 1/2014 | McLaughlin et al. | |
| 8,688,552 B1 | 4/2014 | Sahoo et al. | |
| 8,732,044 B2 | 5/2014 | Lovelett et al. | |
| 8,744,965 B2 | 6/2014 | Blanco et al. | |
| 8,751,384 B2 | 6/2014 | Myklebust et al. | |
| 8,799,157 B1 | 8/2014 | Weisman et al. | |
| 9,824,342 B2 | 11/2017 | Kelly et al. | |
| 2001/0056390 A1 | 12/2001 | Varadarajan et al. | |
| 2002/0123949 A1 | 9/2002 | VanLeeuwen | |
| 2004/0015392 A1 | 1/2004 | Hammel et al. | |
| 2004/0081302 A1 | 4/2004 | Kim et al. | |
| 2005/0160035 A1 | 7/2005 | Umamyo | |
| 2005/0177448 A1 | 8/2005 | Fu et al. | |
| 2006/0089877 A1 | 4/2006 | Graziano et al. | |
| 2006/0229984 A1 | 10/2006 | Miyuki | |
| 2007/0233615 A1 | 10/2007 | Tumminaro | |
| 2007/0244811 A1 | 10/2007 | Tumminaro | |
| 2007/0255653 A1 | 11/2007 | Tumminaro et al. | |
| 2007/0255662 A1 | 11/2007 | Tumminaro | |
| 2008/0052176 A1 | 2/2008 | Buchheit | |
| 2008/0275779 A1 | 11/2008 | Lakshminarayanan | |
| 2008/0275811 A1 | 11/2008 | Koningstein et al. | |
| 2009/0119171 A1 | 5/2009 | Goff et al. | |
| 2009/0119190 A1 | 5/2009 | Realini | |
| 2009/0171839 A1 | 7/2009 | Rosano et al. | |
| 2009/0177497 A1 | 7/2009 | Raksi et al. | |
| 2009/0288012 A1 | 11/2009 | Hertel et al. | |
| 2010/0017324 A1 | 1/2010 | Brownhill et al. | |
| 2010/0078472 A1 | 4/2010 | Lin et al. | |
| 2010/0088207 A1 | 4/2010 | McLaughlin et al. | |
| 2010/0100480 A1 | 4/2010 | Altman et al. | |
| 2010/0121745 A1 | 5/2010 | Teckchandani et al. | |
| 2010/0174644 A1 | 7/2010 | Rosano et al. | |
| 2010/0205091 A1 | 8/2010 | Graziano et al. | |
| 2011/0125643 A1 | 5/2011 | Cameo et al. | |
| 2011/0166883 A1 | 7/2011 | Palmer et al. | |
| 2011/0246342 A1 | 10/2011 | Gibson et al. | |
| 2011/0251952 A1 | 10/2011 | Kelly et al. | |
| 2012/0150706 A1 | 6/2012 | Hashir | |
| 2012/0166332 A1 | 6/2012 | Naaman | |
| 2012/0197788 A1 | 8/2012 | Sanghvi et al. | |
| 2012/0259688 A1 | 10/2012 | Kim | |
| 2012/0259779 A1 | 10/2012 | Bharghavan et al. | |
| 2013/0013506 A1* | 1/2013 | Wiggins | G06Q 20/405 705/44 |
| 2013/0132244 A1 | 5/2013 | Jenkins et al. | |
| 2013/0227353 A1 | 8/2013 | Dash et al. | |
| 2013/0290177 A1 | 10/2013 | Milam et al. | |
| 2013/0297486 A1* | 11/2013 | Colborn | G06Q 40/02 705/38 |
| 2013/0311362 A1 | 11/2013 | Milam et al. | |
| 2013/0346302 A1 | 12/2013 | Purves et al. | |
| 2014/0070001 A1 | 3/2014 | Sanchez et al. | |
| 2014/0081854 A1 | 3/2014 | Sanchez et al. | |
| 2014/0114842 A1 | 4/2014 | Blackhurst et al. | |
| 2014/0180929 A1 | 6/2014 | Ohnishi et al. | |
| 2014/0244477 A1 | 8/2014 | Kolathur | |
| 2014/0279098 A1 | 11/2014 | Ham | |
| 2014/0351118 A1 | 11/2014 | Zhao | |
| 2015/0142657 A1 | 5/2015 | Sagastiverza et al. | |
| 2015/0220904 A1 | 8/2015 | Gibson et al. | |
| 2015/0356639 A1* | 12/2015 | Sobhani | G06Q 30/0279 705/39 |
| 2015/0364017 A1 | 12/2015 | Hall et al. | |
| 2016/0071094 A1 | 3/2016 | Krishnaiah et al. | |
| 2016/0005037 A1 | 7/2016 | Eilertsen | |
| 2016/0253731 A1 | 9/2016 | Ketchel, III et al. | |
| 2017/0004463 A1 | 1/2017 | Stroeh | |
| 2017/0004468 A1 | 1/2017 | Stroeh | |
| 2017/0004498 A1 | 1/2017 | Stroeh | |
| 2017/0221066 A1* | 8/2017 | Ledford | G06Q 20/4037 |
| 2017/0255908 A1 | 9/2017 | Joubert et al. | |

OTHER PUBLICATIONS

Authorized Officer Agnes Wittmann-Regis, WIPO, International Preliminary Report on Patentability, International Application No. PCT/US2016/038030, dated Jan. 2, 2018, pp. 1-5.

Authorized Officer Norihiko Shiota, Japan Patent Office, International Search Report, International Application No. PCT/US2016/038030, dated Aug. 30, 2016, pp. 1-2.

Authorized Officer Norihiko Shiota, Japan Patent Office, Written Opinion of the ISA, International Application No. PCT/US2016/038030, dated Aug. 30, 2016, pp. 1-4.

Authorized Officer Yuko Sato, Japan Patent Office, International Search Report, International Application No. PCT/US2016/038026, dated Sep. 27, 2016, pp. 1-2.

Authorized Officer Yuko Sato, Japan Patent Office, Written Opinion of the ISA, International Application No. PCT/US2016/038026, dated Sep. 27, 2016, pp. 1-3.

Authorized Officer Agnes Wittmann-Regis, WIPO, International Search Report, International Application No. PCT/US2016/038026, dated Jan. 2, 2018, pp. 1-4.

Authorized Officer Agnes Wittmann-Regis, WIPO, International Search Report, International Application No. PCT/US2016/038024, dated Jan. 2, 2018, pp. 1-5.

Authorized Officer Satohide Tanigawa, Japan Patent Office, International Search Report, International Application No. PCT/US2016/038024, dated Aug. 30, 2016, pp. 1-2.

Authorized Officer Satohide Tanigawa, Japan Patent Office, Written Opinion of the ISA, International Application No. PCT/US2016/038024, dated Aug. 30, 2016, pp. 1-4.

Credit Card Overdraft Protection—Wells Fargo, p. 1, Downloaded Sep. 3, 2014 From https://www.wellsfargo.com/credit-cards/cash-back-college-card/overdra . . . .

Enterprise service bus—Wikipedia, p. 1-6, Downloaded Dec. 11, 2014 From http://en.wikipedia.org/wiki/Enterprise_service_bus.

MasterCard's Global Clearing Management System, p. 1-12, Downloaded Nov. 13, 2014 From http://blog.unibulmerchantservices.com/mastercards-global-clearing-ma . . . .

What You Need to Know About Credit Card Insurance Plans—ABC News, p. 1-4, Downloaded Sep. 3, 2014 From http://abcnews.go.com/Business/credit-card-insurance-plans/story?id=1 . . . .

Using credit card for overdraft protection, p. 1-5, Downloaded Sep. 3, 2014 From http://www.bankrate.com/brm/news/cc/20061128_overdraft_protection . . . .

Select Credit for Overdraft Protection | HSBC, p. 1, Downloaded Sep. 3, 2014 From http://www.us.hsbc.com/1/2/home/personal-banking/select-credit-overdra . . . .

M2 Presswire, "wagamama and MasterCard Launch Okr! with MasterPass for Customers," Mar. 3, 2015, pp. 1-2.

* cited by examiner

ELECTRONIC GRACE PERIOD BILLING

FIELD OF THE DISCLOSURE

The present disclosure relates generally to the electronic and computer arts, and, more particularly, to payment card networks and the like.

BACKGROUND OF THE DISCLOSURE

The use of payment cards, such as credit cards, debit cards, and pre-paid cards, has become ubiquitous. Most payment card accounts have one or more associated physical cards; however, the use of non-traditional payment devices, such as appropriately-configured "smart" cellular telephones, is increasing. In some instances, a card or non-traditional payment device is presented at a brick-and-mortar location. In card-not-present transactions, the card or non-traditional payment device is not physically present at the merchant. One example of a card-not-present transaction is Internet shopping. Another example is card-not-present recurring payments, wherein a card holder provides a merchant with the payment card account number and related information (e.g., expiration date) and the merchant uses this information to initiate recurring (e.g., monthly) transactions.

SUMMARY OF THE DISCLOSURE

Principles of the disclosure provide techniques for electronic grace period billing. In one aspect, an exemplary method includes the steps of obtaining, from a given one of a plurality of billers, over a payment network having a standard clearing and settlement time period, an authorization request for a payment transaction; and passing, via the payment network, a special IOU approval authorization request response to the authorization request for the payment transaction, indicating that the given one of the plurality of billers will be paid in connection with the payment transaction after expiration of a grace period from a time of the authorization request, regardless of whether funds are available for an account associated with the payment transaction. The grace period is longer than the standard clearing and settlement time period. A further step includes refraining from clearing and settling the payment transaction until expiration of the grace period.

In another aspect, another exemplary method includes the steps of enrolling a plurality of account holders in a grace period billing program; obtaining, from a given one of a plurality of billers, over a payment network having a standard clearing and settlement time period, an authorization request for a payment transaction; and dispatching, into the payment network, a special IOU approval authorization request response to the authorization request for the payment transaction, indicating that the given one of the plurality of billers will, in accordance with the grace period billing program, be paid in connection with the payment transaction after expiration of a grace period from a time of the authorization request, regardless of whether funds are available for an account associated with the payment transaction. The grace period is longer than the standard clearing and settlement time period.

In still another aspect, still another exemplary method includes the steps of enrolling a plurality of billers in a grace period billing program; and obtaining, via a payment card network, a special IOU approval authorization request response to an authorization request for a payment card transaction, indicating that a given one of the plurality of billers will be paid in connection with the payment transaction after expiration of a first grace period from a time of the authorization request, regardless of whether funds are available for an account associated with the payment transaction. The grace period is longer than a standard clearing and settlement time period for the payment card network. A further step includes passing the IOU approval authorization request response to the given one of the plurality of billers.

In a further aspect, an exemplary payment card network has a standard clearing and settlement time period and includes an acquirer payment card network interface configured to obtain, from a given one of a plurality of billers, an authorization request for a payment card transaction; and an issuer payment card network interface configured to obtain from a corresponding issuer, a special IOU approval authorization request response to the authorization request for the payment card transaction, indicating that the given one of the plurality of billers will be paid in connection with the payment card transaction after expiration of a grace period from a time of the authorization request, regardless of whether funds are available for an account associated with the payment card transaction. The grace period is longer than the standard clearing and settlement time period. The payment card network also includes a clearing and settlement system coupled to the acquirer payment card network interface and the issuer payment card network interface; the clearing and settlement system in turn includes a hold queue which holds the payment card transaction so that the payment card transaction does not settle until expiration of the grace period.

Aspects of the disclosure contemplate the method(s) performed by one or more entities herein, as well as facilitating one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the disclosure or elements thereof can be implemented in the form of a computer program product including a tangible computer readable recordable storage medium with computer usable program code for performing the method steps indicated stored thereon in a non-transitory manner. Furthermore, one or more embodiments of the disclosure or elements thereof can be implemented in the form of a system (or apparatus) including a memory and at least one processor that is coupled to the memory and operative to perform exemplary method steps. Yet further, in another aspect, one or more embodiments of the disclosure or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the disclosure can provide substantial beneficial technical effects. For example, delivering electronic grace period billing via an existing payment network is easier and more desirable because pertinent components of the system (authorization, settlement, message specifications, etc.) are already in place and can be modified as taught herein to implement one or more embodiments.

These and other features and advantages of the present disclosure will become apparent from the following detailed description of illustrative embodiments thereof, which is to be read in connection with the accompanying drawings.

DETAILED DESCRIPTION OF PREFERRED EMBODIMENTS

Payment Devices and Associated Payment Processing Networks

Figure 1:
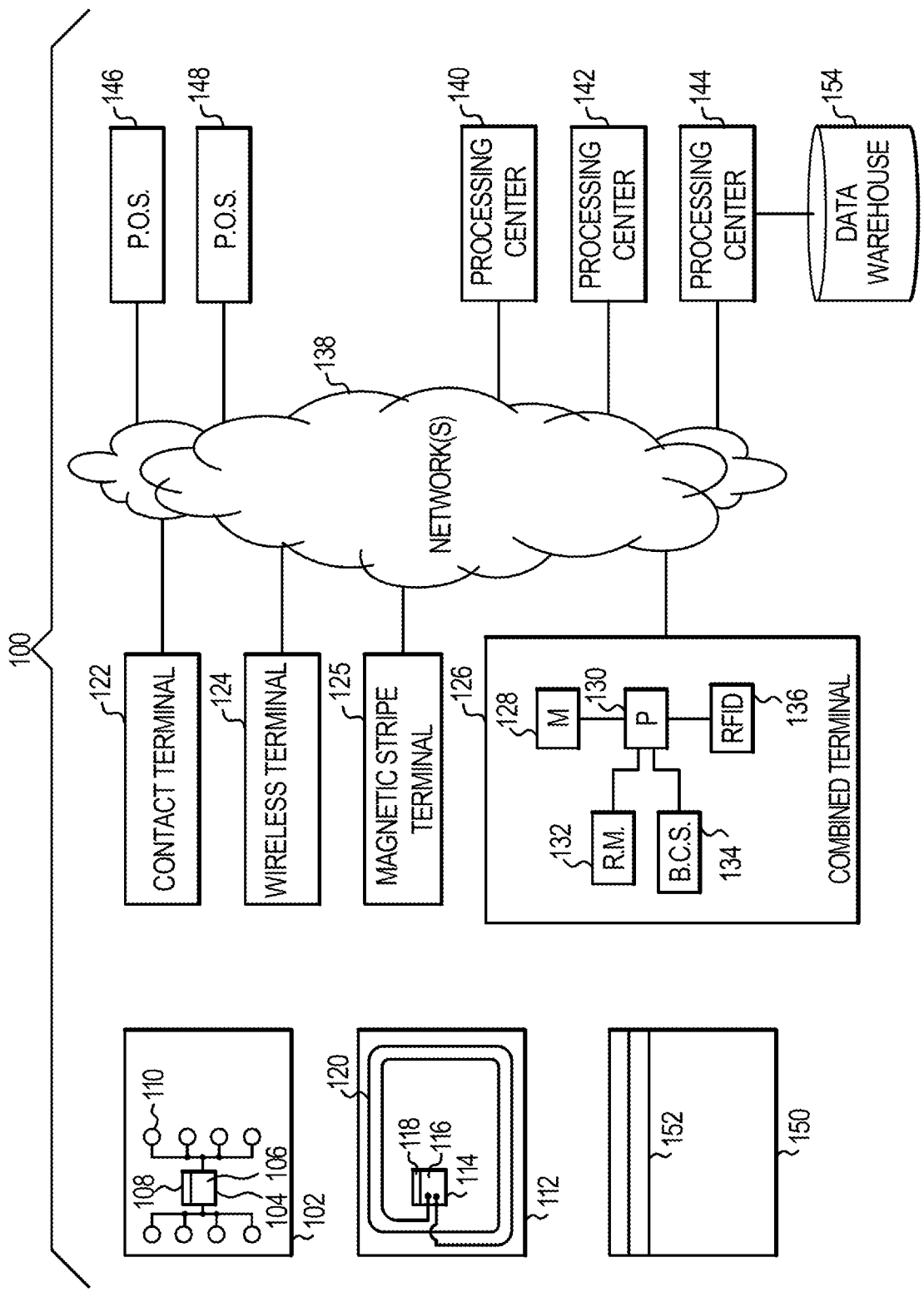
FIG. 1 shows an example of a system and various components thereof that can implement techniques of the disclosure.

Attention should now be given to FIG. 1, which depicts an exemplary embodiment of a system 100, according to an aspect of the disclosure, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 per se may function with other types of devices in lieu of or in addition to "smart" or "chip" cards 102, 112; for example, a conventional magnetic stripe device 150, such as a card having a magnetic stripe 152. Furthermore, an appropriately configured mobile device (e.g., "smart" cellular telephone handset, tablet, personal digital assistant (PDA), and the like) can be used to carry out contactless payments in some instances. One non-limiting example of a new approach is the Apple Pay app, a mobile payment and digital wallet service from Apple Inc., Cupertino, Calif., US.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used to implement some aspects or embodiments of the present disclosure is the MULTOS® operating system licensed by MAOSCO Limited (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the MasterCard® PayPass™ specifications, available under license from MasterCard International Incorporated of Purchase, N.Y., USA (trademarks of MasterCard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards, e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN), such as is described with respect to FIG. 2 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as reader module 132 that is coupled to the processor and configured to interface with the portable apparatuses 102, 112, 150. The processor 130 can be operable to communicate with portable payment devices of a user via the reader module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification from a UPC code or RFID tag on a product to be purchased.

The above-described devices 102, 112 can be International Organization for Standardization (ISO) 7816-compliant contact cards or devices or NFC (Near Field Communications) or ISO 14443-compliant proximity cards or devices. In operation, card 112 can be touched or tapped on the wireless terminal 124 or reader module 132 (or an associated reader), which then contactlessly transmits the electronic data to the proximity IC chip in the card 112 or other wireless device.

One or more of the processing centers 140, 142, 144 can include a database such as a data warehouse 154.

It should be noted that the system depicted in FIG. 1 may involve not only conventional transactions at "brick and mortar" merchants, but also, card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction.

In some cases, there can be payment card accounts that do not have physical cards or other physical payment devices associated therewith; for example, a customer can be provided with a PAN, expiration date, and security code, but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
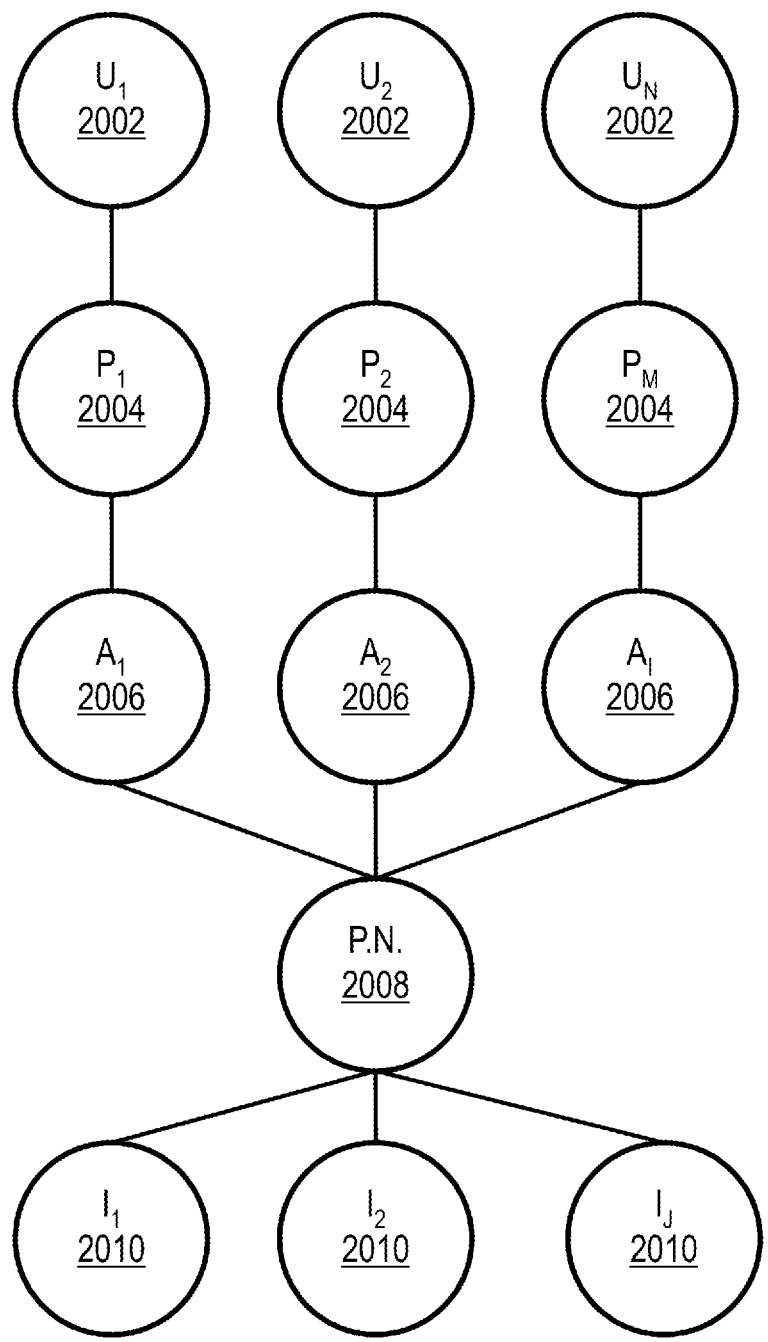
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the disclosure.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator of a payment network 2008 configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal. Note also that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the consumer 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the payment network 2008, which debits the issuers 2010 for payment and credits the acquirer 2006. Once the acquirer 2006 has been paid, the acquirer 2006 pays the merchant 2004.

It will be appreciated that the payment network 2008 shown in FIG. 2 is an example of a payment network configured to facilitate transactions between multiple issuers and multiple acquirers, which may be thought of as an "open" system. Some embodiments of the disclosure may be employed with other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer are the same entity.

Again, it should be noted that a detailed illustrative description is provided in the context of an ISO 8583 payment card network. However, one or more embodiments are applicable in networks where transactions can be suitably flagged for delayed clearing and settlement (either currently or with modification). Thus, non-limiting examples of networks via which a service according to one or more embodiments could be delivered include MASTERCARD, VISA, AMERICAN EXPRESS, or even PAYPAL or the like.

Messages within a network such as network 138 and/or network 2008, may, in at least some instances, conform to the ISO Standard 8583, Financial transaction card originated messages—Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)
ISO 8583 Part 2: Application and registration procedures for Institution Identification Codes (IIC) (1998)
ISO 8583 Part 3: Maintenance procedures for messages, data elements and code values (2003)
ISO 8583:1993 (1993)
ISO 8583:1987 (1987)

As used herein, a "payment card network" is a communications network that uses payment card account numbers, such as primary account numbers (PANs), to authorize, and to facilitate clearing and settlement of, payment card transactions—such as for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN) (which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of MasterCard International Incorporated of Purchase, N.Y., USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network.

Figure 6:
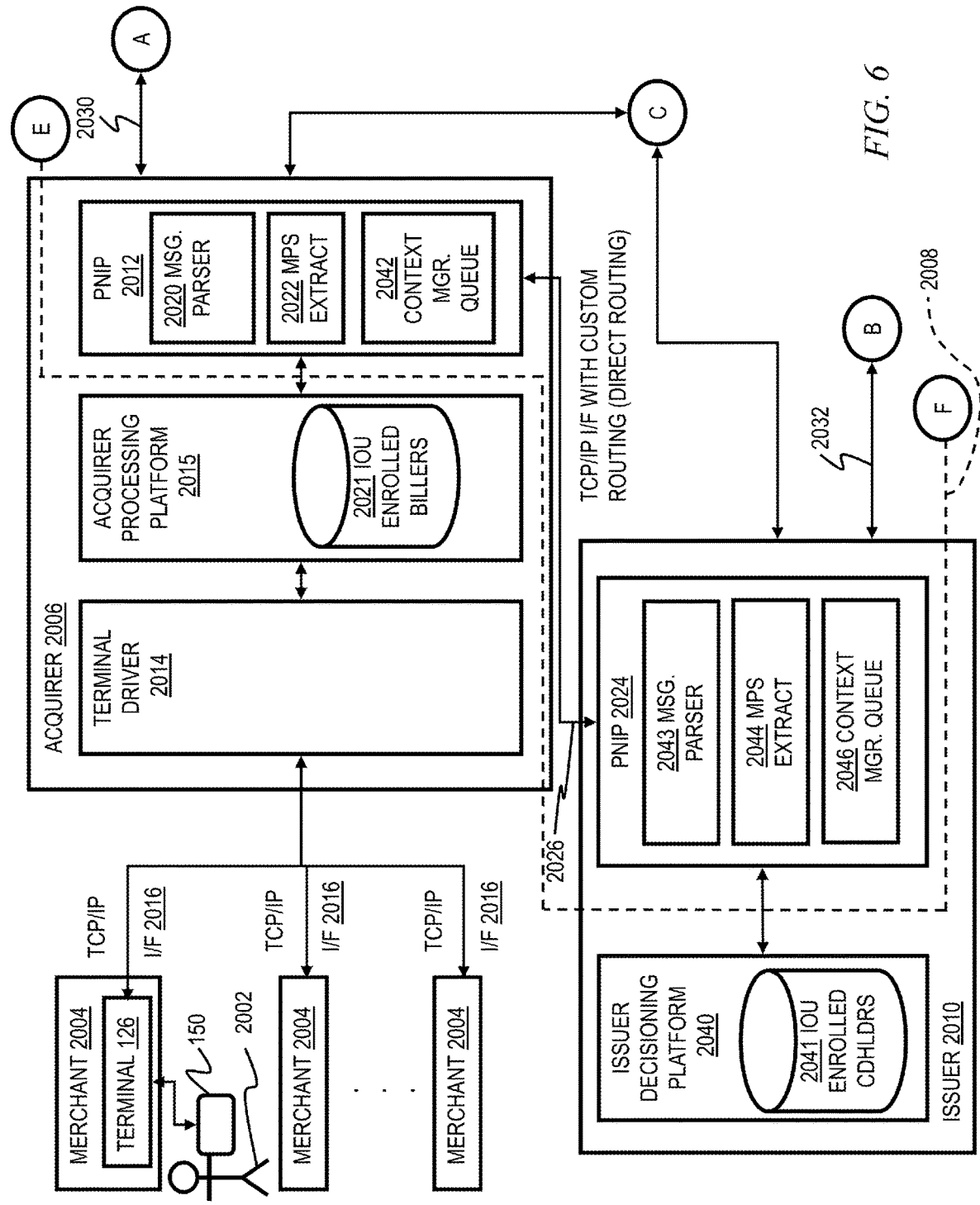
FIGS. 6 and 7 provide an exemplary detailed view of operation of a payment card network, in accordance with an aspect of the disclosure.
Figure 7:
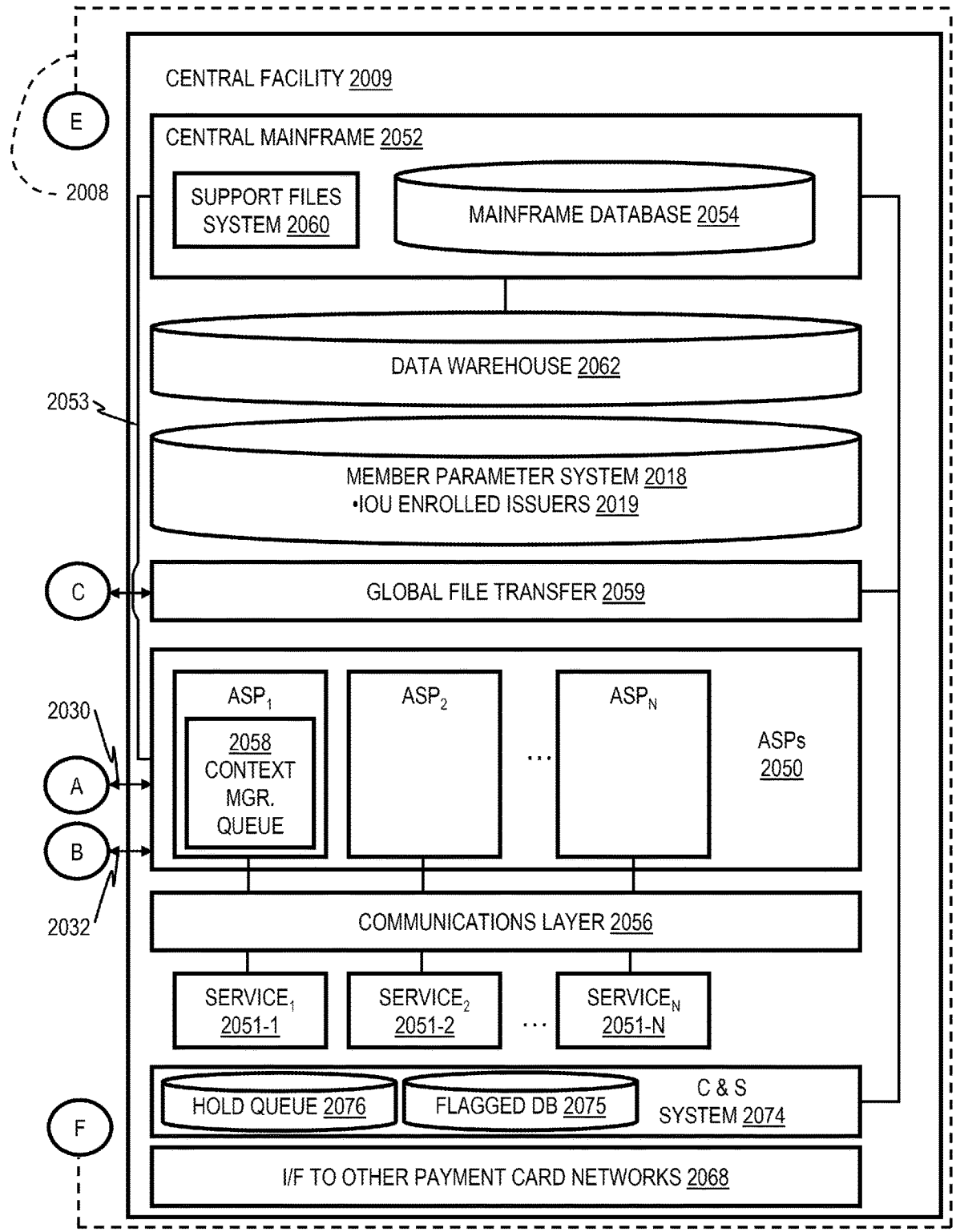

Still referring to FIG. 2, and with reference also now to FIGS. 6 and 7, by way of review and provision of additional detail, a consumer 2002 effectively presents his or her card 150 or other payment device (e.g., presents suitably configured "smart" phone or uses an e-wallet) to the terminal 126 of a merchant. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information). The merchant terminal 126 captures the card account information (by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 6 and 7 encompasses the network 2008. Note generally that points A, B, C, E, and F in FIG. 6 connect to the corresponding points in FIG. 7; the entire network and associated environment are not amenable to illustration on a single sheet.

More specifically, the acquirer 2006, in the more specific example of FIGS. 6 and 7, has at its premises a payment network interface processor (PNIP 2012). The MasterCard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format. The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS)

2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by MasterCard for use by a member to uniquely identify activity the member is responsible for. A BIN or Bank Identification Number is a unique series of numbers assigned by MasterCard to a principal member and used as the first six digits of a cardholder account number. Other payment card networks have similar types of numbers, as will be apparent to the skilled artisan.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 configuration and transactions from that account range are then routed to the port from which the sign-in request is received. A member ID can be present on ports on multiple PNIPs at an Issuer site—see discussion of FIG. 10 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages routed directly to the issuer PNIP: In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050, and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 8:
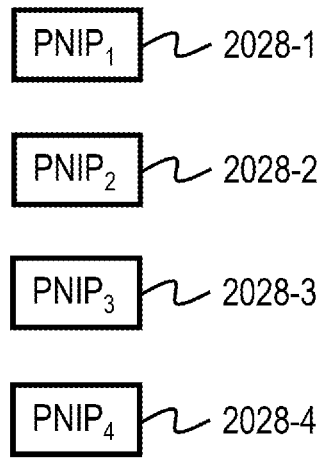
FIG. 8 shows a group of payment network interface processors, such as may be used with the network of FIGS. 6 and 7.
Figure 9:
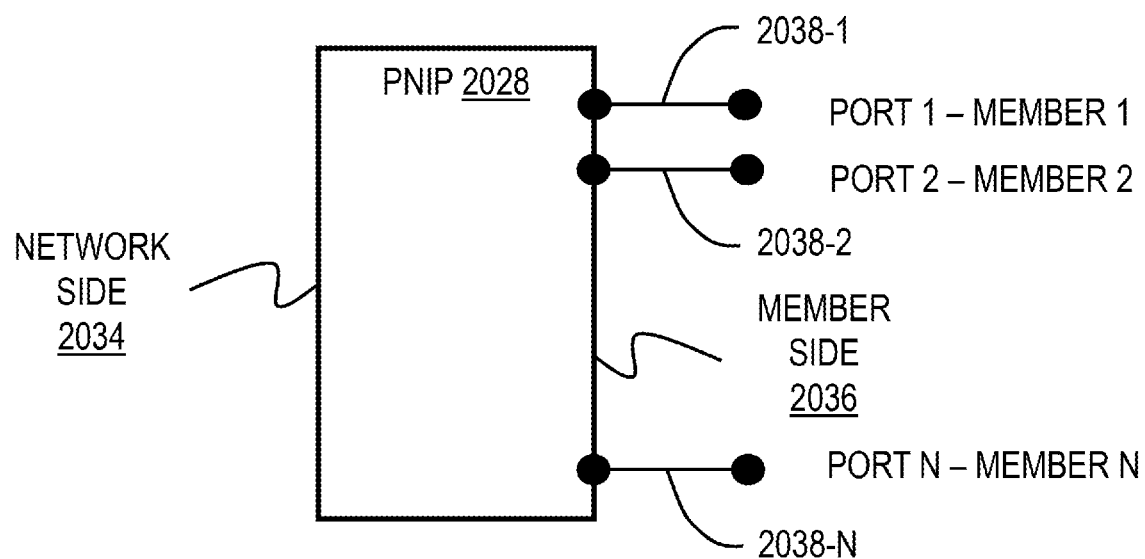
FIG. 9 shows a port arrangement on a payment network interface processor, such as may be used with the network of FIGS. 6 and 7.

FIG. 8 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 8 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 9 where a generalized PNIP 2028 has a network side 2034 and a member side 2036. Member side 2036 has N ports 2038-1 through 2038-N to members 1 to N. N is used herein as a generalized arbitrary integer and the value of N in FIG. 9 is not necessarily the same as that of N in connection with elements 2002 in FIG. 2, for example.

Figure 10:
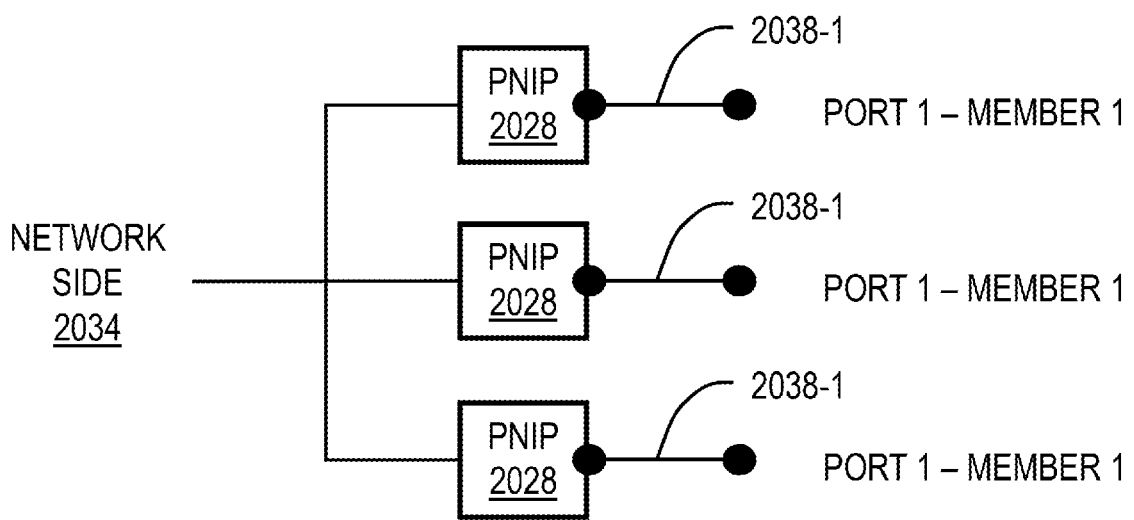
FIG. 10 shows a case wherein an issuer has multiple payment network interface processors.

As seen in FIG. 10, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 9). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 6 and 7 show "MPS extract" 2022, 2044; this will typically include the extract itself and the associated parameter file manager which manages obtaining the extracts from MPS 2018. Similarly, to reduce clutter, FIGS. 6 and 7 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 6 and 7 to avoid clutter.

Messages in case of enhanced services: In one or more instances, a special architecture is used to facilitate delivery of enhanced services (the ASP 2050 in FIGS. 6 and 7 is a non-limiting example). Examples of enhanced services include the MASTERCARD IN CONTROL product providing spending controls and/or virtual card numbers (MASTERCARD IN CONTROL is generally representative of spend control systems, card control systems, and the like, and embodiments indicated as employing MASTERCARD IN CONTROL are not intended to imply any limitation to one particular spend control and/or card control system). Other examples of enhanced services are loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transactions is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, MASTERCARD IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the MASTERCARD IN CONTROL service can be accessed via an instance of an Enterprise Service Bus.

Entry of data into the data warehouse: In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and settlement: One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic aspects: Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.
Grace Period IOU Billing and Exemplary Implementation Thereof on an ISO 8583 Payment Card Network One or more embodiments provide grace period (IOU) billing—a solution which enables a biller, such as a utility company, to collect payment card payments from consumers even when the funds are not immediately available. This approach may be provided, for example, to consumers who are known and validated members of a payroll program. Consumers benefit by having the ability to better manage their payments even when due dates for bills are not synchronized with payroll dates.

In a typical recurring bill payment scenario, a consumer provides his or her prepaid (or other) payment card account number to a merchant and authorizes the merchant to bill the consumer for the amount of the consumer's purchase every month (or other recurring time period), on some predetermined date (e.g., first of every month). In some instances, the merchant tries to charge the on-file card number on the predetermined date but the merchant receives a decline (e.g., prepaid payment card has insufficient funds, demand deposit account has insufficient funds for a debit card, or open to spend balance is too low for a credit card). Currently, in such circumstances, the merchant may cut off the consumer's services for the month in question (where permitted) and/or a fee may be charged for late payment.

In contrast, in one or more embodiments, the cardholder, issuer, and the biller opt-in to an "IOU" program. In this aspect, when, on the predetermined date, the merchant sends an authorization request (AUTH; e.g., ISO 8583 0100) to the issuer 2010; the issuer determines that while the cardholder "has no money" (e.g., prepaid payment card has insufficient funds, demand deposit account has insufficient funds for a debit card, or open to spend balance is too low for a credit card), the cardholder has opted in to the IOU program. For example, the issuer decisioning platform 2040 accesses a database 2041 of IOU enrolled cardholders with a record for the cardholder's account with a flag that the cardholder participates in IOU billing. As opposed to current techniques, in one or more embodiments, the issuer can respond to the AUTH request by indicating, in effect, "I decline for a typical transaction but I approve for an IOU transaction." The issuer pays the merchant at the point when the cardholder is expected to actually have funds available in the payment card account (in one or more embodiments, the issuer is committed to pay in any event, i.e., whether the cardholder actually has the funds at that point or not).

As used herein, a "prepaid payment card" (also referred to in shorthand as a "prepaid card") refers to a card or other device (e.g., appropriately configured cellular phone handset) configured according to a credit or debit card type payment system standard or specification (as opposed to a dedicated transit card or the like), wherein a stored balance associated with the card resides on a central or remote server, which prepaid payment card is designed for use in a conventional credit or debit card environment (for example, of the kind as shown in FIGS. 1, 2, & 6-10), and which is nearly universally accepted worldwide by merchants of all kinds Such a card is also distinguished from a credit or debit card, in that it accesses a balance on a central server rather than a credit account (e.g., open to spend line of credit) or bank account (e.g. checking or other demand deposit account). A debit card is typically connected to a checking account whereas a pre-paid card is not.

One or more embodiments use a special "IOU" transaction. Instead of responding to the AUTH request with a conventional approval or decline, the issuer responds with a special "IOU approval." In a conventional scenario (conventional AUTH request with conventional "approval" AUTH request response), the merchant will typically be paid in about 2-3 days after issuer approval. In one or more embodiments using the special "IOU" transaction, a longer time elapses before the merchant is paid (in a non-limiting example, 15-20 days after issuer gives the special "IOU approval"). Furthermore, in one or more embodiments, by the issuer providing the special "IOU approval," the issuer is committing to pay the merchant on the (extended) date, regardless of whether the cardholder actually has funds available at that point. In this aspect, the issuer ultimately holds the credit risk for the consumer and must judge whether the cardholder will eventually have the funds to pay.

The IOU response used in one or more embodiments is implemented as a new response code value in data element 39 (DE39). Each transaction is made up of multiple data elements; the response from the issuer is included in data element 39 of the ISO 8583 0110 AUTH request response. Within DE39 in the response, a new value is defined identifying the response as an IOU response. In one or more embodiments, issuer decisioning platform 2040 flags the response as an "IOU" response and when issuer PNIP 2024 notes the special value within DE39 indicating that the response is an "IOU response," the response is handled in an appropriate manner. The ISO 8583 0110 AUTH request response is sent back to the acquirer 2006 and to the merchant 2004 so that the transaction can go forward, if the merchant is a merchant that will accept an IOU transaction. In some cases, the ISO 8583 0110 AUTH request response is sent directly back to the acquirer 2006 as shown at 2026 and clearing and settlement are delayed as described elsewhere herein. In other cases, the issuer PNIP 2024 does not send the ISO 8583 0110 AUTH request response directly to acquirer PNIP 2012 but rather treats the AUTH request response as requiring enhanced services and routes it to ASPs 2050. In this embodiment, when received at the ASPs 2050, presence of the special value within DE39 triggers a message to the clearing and settlement system 2074 to place the transaction identifier for the given transaction in a flagged database 2075 (again, for the avoidance of doubt, in either case, the ISO 8583 0110 AUTH request response is sent back to the acquirer 2006 in real time so the transaction can go forward if the merchant accepts IOU transactions). In the embodiment employing the flagged database 2075, clearing messages are checked for presence of transaction identifiers in flagged database 2075; if present, those transactions are placed in hold queue 2076. In one or more embodiments, service parameters are included in the extract from MPS (2018) to the Acquirer PNIP 2012 and Issuer PNIP 2024 platforms to indicate that the account range is eligible for the IOU service. These service parameters allow the systems to trigger enhanced routing and/or service fulfillment.

The amount of time for which clearing and settlement is to be delayed may be fixed at a predetermined value (two weeks is a non-limiting example) or in alternative embodiments may be configurable to any desired value. Where the delay is to be configurable, the relevant parties are notified, as discussed below.

As noted, in one or more embodiments, the special "IOU approval" is implemented as a new response code value in data element 39 (DE39) of the ISO 8583 0110 response. Currently, it is possible to be "declined for a reason." In one or more embodiments, the transaction is "approved for an IOU." IOU in this context means that the merchant gets paid after a longer elapsed time as discussed above. Furthermore in this regard, in general, authorization requests are responded to with either an "approval" or a "decline with reason" code. In one or more embodiments, a new type of approval is defined, namely, an "IOU approval" that simply indicates that for the given transaction, the issuer will pay the amount owed in, say, 20 days (or other agreed-upon extended period) rather than in the usual two to three days.

In some embodiments, pricing may be different as well. For example, the interchange paid by merchants may be different (e.g., lower) than in a typical purchase transaction. Also, the payment card network operator may price the transaction higher or lower than typical to both issuers and acquirers.

One or more embodiments involve opt-in (e.g., via registration) by both the biller and the cardholder. The cardholder benefits in that if he or she is short of money, the bill still gets paid. The biller also benefits in that, rather than shutting the consumer off or assessing a penalty, the biller can obtain a guaranteed payment, albeit somewhat later than usual.

Figure 3:
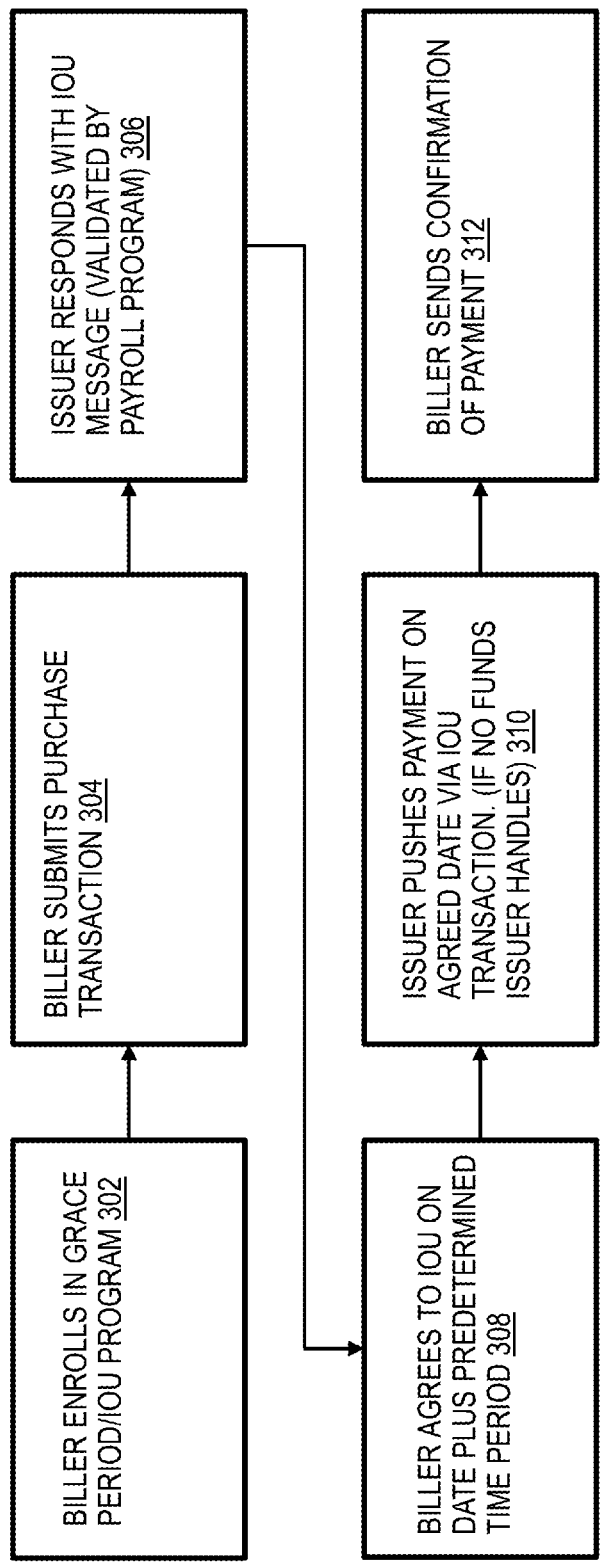
FIG. 3 is a flow chart of an exemplary method, from the standpoint of a biller, in accordance with an aspect of the disclosure.
Figure 4:
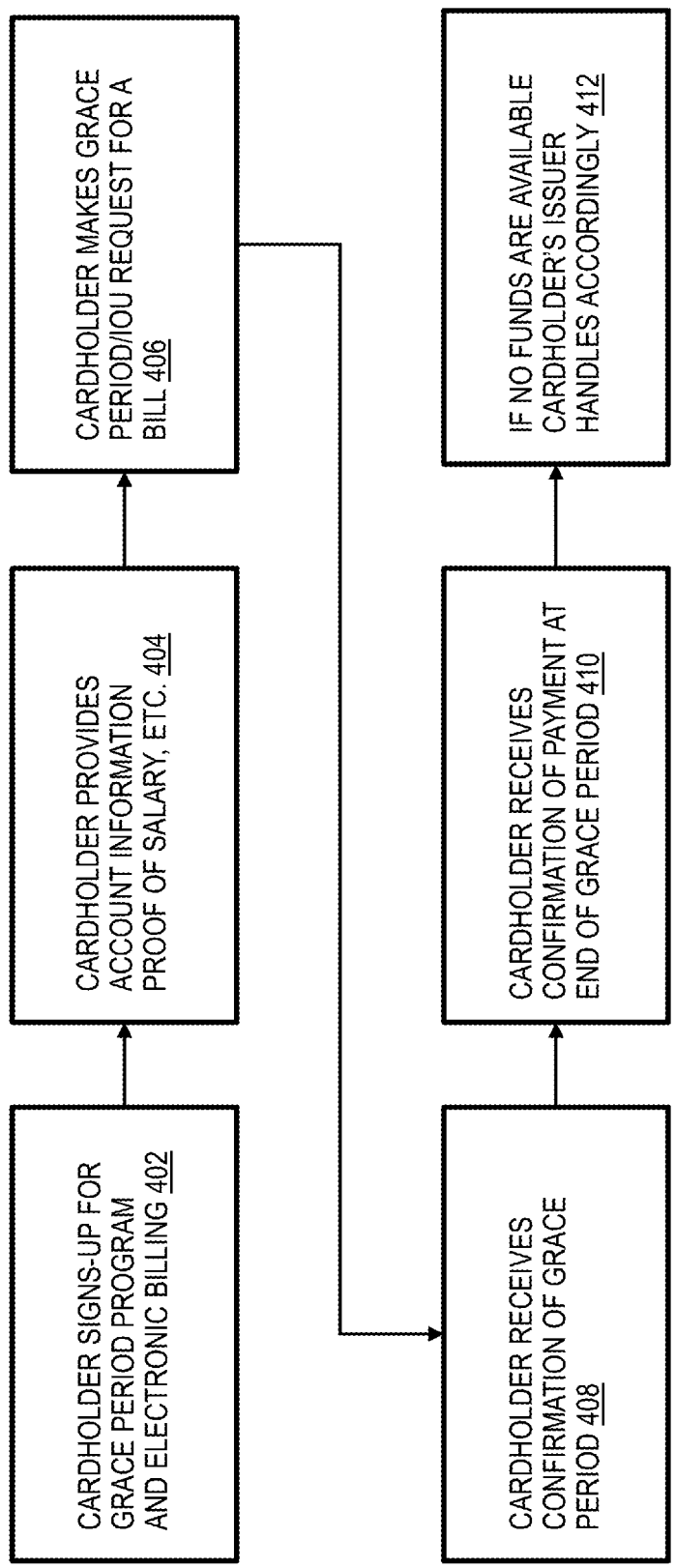
FIG. 4 is a flow chart of an exemplary method, from the standpoint of a cardholder, in accordance with an aspect of the disclosure.

FIG. 3 is a flow chart of an exemplary method, from the standpoint of a biller (e.g., merchant 2004), in accordance with an aspect of the disclosure. FIG. 4 is a flow chart of an exemplary method, from the standpoint of a cardholder (e.g., 2002), in accordance with an aspect of the disclosure. In step 302, one or more billers or merchants enroll in the grace period (IOU) program. In step 402, one or more cardholders enroll in the grace period (IOU) program and optionally for electronic billing. That is to say, a cardholder may optionally tell a merchant that the merchant should just charge the same card every month. As seen in step 404, as part of the enrollment process, the cardholder provides appropriate information such as his or her personal information; proof of salary, employer, and payroll account; employee validation; and the like. More generally, the cardholder should indicate what he or she earns. The cardholder also requests treatment under the grace period/IOU program for a specific biller (e.g., electric utility), as seen in step 406. In step 304, the biller submits a purchase transaction. In step 306, the issuer (e.g., 2010) responds with an IOU message (i.e., the special "IOU approval") discussed above (in at least some embodiments, the IOU message is only utilized when there are insufficient funds).

Note that in some embodiments, if the service is delivered on a payroll card program, the issuer of that payroll card should verify that the person continues to work for that employer; this is referred to as "validated by payroll program."

In some instances, the person enrolls via his or her issuer, and merchants enroll separately. Then, at the time of purchase, if the amount would take the balance negative, the issuer responds with the IOU message.

In step 308, the biller agrees to receive the IOU payment after the longer elapsed time discussed above (e.g., 15-20 days (predetermined time period) after the date that the issuer gives the special "IOU approval"). This is implicit when the biller signs up for the IOU service. In step 408, the cardholder receives confirmation that the bill in question will be handled under the grace period program. Confirmation can be received, for example, via E-mail, text message, on the cardholder's transaction activity statement (online or printed), or the like. In step 310, the issuer pushes the payment on the agreed-upon date (e.g., 15-20 days after the date that the issuer gives the special "IOU approval"). Settlement then ensues.

By way of review and provision of additional detail, in one or more embodiments, clearing messages are held off to the side as they come in to the system. In general, IOU delayed clearing and settlement can be accomplished in a number of different ways:

First non-limiting exemplary alternative: The 0110 auth request response is flagged to indicate an IOU transaction, and so are the clearing and settlement messages. The 0110 auth request response can go directly from the issuer to the acquirer and back to the merchant; it need not pass through central facility 2009. The clearing and settlement messages are intercepted by the central facility based on the flag, and are placed in the hold queue 2076 based on the IOU transaction flag. The merchant will have a batch of completed transactions to send to the acquirer at the end of the day including "regular" and "IOU" transactions. As the merchant builds the clearing messages, there is a place to indicate that some transactions are IOU transactions. The merchant sends the file to the acquirer who sends it to central facility 2009. The payment network separates the regular from the IOU transactions. The latter are placed in hold queue 2076 based on the IOU indication.

In one or more embodiments utilizing this alternative, the acquirer puts an IOU flag in the clearing message. For example, an ISO 8583 MTI 1240 combined with DE24function code value 200 is used for a first presentment (BAU), and a new private data sub-element (PDS) is used within the MTI 1240 message to flag the transaction as an IOU transaction. This flag is noted by the payment card network and the transaction is placed in the hold queue 2076. If the grace period is configurable, the payment card network may be informed of the time period during enrollment/registration or in a special data element or sub-element in the 0110 and/or 1240 messages, for example. It should also be noted, regarding delay of clearing and settlement, that normally, depending on the interchange rate designator that the acquirer uses, there are certain "timeliness edits" around the interchange rate designators. For example, some transactions are required to be sent into clearing and settlement within (a non-limiting example) 3-5 days; some may be longer. However, a 2-week hold might fail the timeliness edits. Furthermore, in at least some instances, the payment network sends back appropriate messages to facilitate reconciliation. In one or more embodiments, the parties who set the timeliness edits agree to the delay period during the enrollment/registration process. This alternative is business as usual for the acquirer except for the inclusion of the new PDS IOU flag.

Second non-limiting exemplary alternative: The 0110 auth request response is flagged to indicate an IOU transaction; but the clearing and settlement messages need not be. The 0110 auth request response does not go directly from the issuer to the acquirer and back to the merchant; it first passes through central facility 2009 where its unique transaction number goes into flagged database 2075. When clearing and settlement messages come in to central facility 2009, the unique transaction numbers are checked against the aforementioned flagged database 2075 and clearing and settlement are delayed for those IOU transactions listed in the hold database, by placing them in the hold queue 2076.

As in the first exemplary alternative, if the grace period is configurable, the payment card network may be informed of the time period during enrollment/registration or in a special data element or sub-element in the 0110 and/or 1240 messages, for example. The above comments regarding "timeliness edits" around the interchange rate designators are also applicable here.

This alternative is business as usual for the acquirer; the payment card network needs to check the transaction identifier for every transaction presented for clearing and settlement against the flagged database 2075 and place it in the hold queue 2076 if appropriate.

Third Non-Limiting Exemplary Alternative: here, the acquirer delays initiating clearing and settlement. If the grace period is configurable, the acquirer may be informed of the time period during enrollment/registration or in a special data element or sub-element in the 0110 message, for example. The above comments regarding "timeliness edits" around the interchange rate designators are also applicable here. This alternative is business as usual for the payment card network.

It is worth noting that in any of the alternatives, the central facility 2009 may keep a copy of the 0110 message and place it in a file, using the ASPs 2050, for validation purposes.

In one or more embodiments, to make the service easier to implement, the operator of a payment card network will record all IOU authorizations and hold the 'clearing messages' off to the side as they come in (e.g., in queue 2076), and then process the clearing messages when the IOU period ends.

Regarding the issuer pushing the payment, in a "pull" payment, the entity to be paid initiates the payment; in a "push" payment, the entity doing the paying initiates the payment. Stated in another way, in a "pull" payment, the card account is processed by the merchant using existing point-of-sale or point-of-interaction technology with the merchant's acquirer; in a "push" payment, the buyer rather than the supplier or merchant pushes the information to the merchant's acquirer (e.g., via a gateway such as the electronic transaction apparatus described in U.S. Pat. No. 8,732,044 of Lovelett, et al. (expressly incorporated herein by reference in its entirety for all purposes)). Suitable alternate terminology is "supplier initiated payment" (same as PULL—entity to be paid (or third party as discussed) has card number and will "hit" number) and "buyer initiated payment" (PUSH—buyer only gives the entity to be paid (or third party as discussed) the card number and directs that entity to "hit" the card when buyer is ready to).

If no funds are available in the cardholder's account, the issuer nevertheless pays the biller and addresses the problem directly with the cardholder. Assuming all is in order, the biller sends confirmation of payment to the cardholder in step 312. As above, confirmation can be received, for example, via E-mail, text message, on the cardholder's transaction activity statement (online or printed), or the like (these modes of communication are generally applicable to notifications mentioned herein). As seen in step 410, the cardholder receives the confirmation of payment at the end of the predetermined time (grace) period. As seen in step 412, and as discussed with regard to step 310, if no funds are available in the cardholder's account, the issuer nevertheless pays the biller and addresses the problem directly with the cardholder. The issuer may take appropriate action with regard to the cardholder, such as charging a fee, making a second attempt, canceling further participation in the grace period/IOU program, canceling the card account, pursuing collection activity, or the like, as permitted by applicable laws, rules, and regulations.

Once or more embodiments make use of a payment card network; BANKNET and VISANET are non-limiting examples. One or more embodiments employ a special, novel "IOU approval" authorization request response.

Some embodiments include edits that indicate which customers can have the IOU functionality on the merchant side. In some instances, the cardholders enroll with the issuer and cardholder enrollment is recorded in IOU enrolled cardholders database 2041. Biller enrollment is optional—billers may just chose to work with their acquirers. Acquirers such as acquirer 2006 may keep a database 2021 of enrolled billers. Issuers may not need to enroll; they may just decide to start using the IOU transaction type. In some cases, the issuer 2010 is flagged in the member parameter system 2018 as participating in the IOU program, as seen at 2019. Some embodiments provide BIN-level control to prevent use of the IOU response in connection with, e.g., gift cards. Some embodiments permit an issuer to respond with an IOU approval but further permit the acquirer to decline if the acquirer does not want to handle an IOU transaction (e.g., if the corresponding merchant is not present in database 2021). In such instances, the acquirer sends a decline to the merchant and a reversal back to the issuer as is currently done in some other circumstances. In some cases, the only enrollment is the cardholder enrolling with the issuer. As discussed above, as part of the enrollment process, the pertinent entities may agree on the amount of time for the grace period.

Given the discussion thus far, and with continued reference to FIGS. 3, 4 and 6-10, it will be appreciated that, in general terms, an exemplary method, according to an aspect of the disclosure, includes the step of obtaining, from a given one of a plurality of billers (e.g., 2004), over a payment network (e.g., a payment card network of which 2008 is a non-limiting example, a PAYPAL type network, etc.) having a standard clearing and settlement time period (in a non-limiting example, 2-3 days), an authorization request (ISO 8583 MTI 0100 is a non-limiting example) for a payment transaction. This step can be carried out, for example, by PNIP 2012 at the edge of network 2008. A further step includes passing, via the payment network, a special IOU approval authorization request response (ISO 8583 MTI 0110 is a non-limiting example) to the authorization request for the payment transaction. Passing includes, for example, passing along an ISO 8583 MTI 0110 from an issuer or both preparing and sending a response in a 3-party or PAYPAL type network. In the former case, for example, network 2008 passes the message as shown at 2026 or optionally as at 2032, 2030. The special IOU approval authorization request response indicates that the given one of the plurality of billers will be paid in connection with the payment transaction after expiration of a grace period from the time of the authorization request, regardless of whether funds are available for an account associated with the payment transaction. The grace period is longer than the standard clearing and settlement time period. An even further step includes refraining from clearing and settling the payment transaction until expiration of the grace period. Non-limiting exemplary ways of implementing the refraining step are discussed elsewhere herein.

In some cases, the payment network is a payment card network (2008 is a non-limiting example) and the payment transaction is a payment card transaction. In at least some such cases, the step of refraining from clearing and settling is carried out at an intermediate node (e.g., 2009) in the payment card network, and the step of passing the special IOU approval authorization request response includes obtaining the response from an issuer 2010 of a payment card associated with the payment card transaction (e.g. via PNIP 2024).

In some cases, a further step includes obtaining, via the payment card network (e.g., via PNIP 2012), a clearing message (in a non-limiting example, an ISO 8583 message type indicator 1240 with data element 24 function code value 200 and a private data sub-element IOU flag) indicating that the payment transaction is to be cleared and settled in accordance with terms of the special IOU approval authorization request. In at least some such cases, the refraining step is responsive to the clearing message (e.g., transaction is placed in queue 2076 in response to noting IOU flag in clearing message).

In an alternative approach, further steps include storing an identifier of the payment card transaction in a database (e.g., flagged database 2075) in response to the step of obtaining, via the payment card network, the special IOU approval authorization request response; and obtaining, via the payment card network, a clearing message indicating that the payment card transaction is to be cleared and settled. In at least some such cases, the refraining step is responsive to the identifier of the payment card transaction being found in the database when the clearing message is obtained. For example, in this alternative, when PNIP 2024 "sees" that the transaction is an IOU, it routes response back to ASPs 2050 where the transaction identifier is stored in flagged database 2075; when the clearing message comes in, the transaction identifier is noted in the database and the transaction is placed in the hold queue 2076.

In some cases, the payment card includes a prepaid payment card.

Furthermore, given the discussion thus far, and with continued reference to FIGS. 3, 4 and 6-10, it will be appreciated that, in general terms, another exemplary method, according to another aspect of the disclosure, includes the step of enrolling a plurality of account holders in a grace period billing program (e.g., issuer 2010 enrolls the account holders in database 2041). A further step includes obtaining, from a given one of a plurality of billers (e.g., merchant 2004), over a payment network (e.g., a payment card network of which 2008 is a non-limiting example, a PAYPAL type network, etc.) having a standard clearing and settlement time period (in a non-limiting example, 2-3 days), an authorization request (ISO 8583 MTI 0100 is a non-limiting example) for a payment transaction. For example, issuer decisioning platform 2040 obtains the authorization request via PNIP 2024. A still further step includes dispatching, into the payment network, a special IOU approval authorization request response (ISO 8583 MTI 0110 is a non-limiting example) to the authorization request for the payment transaction, indicating that the given one of the plurality of billers will, in accordance with the grace period billing program, be paid in connection with the payment transaction after expiration of a grace period from a time of the authorization request, regardless of whether funds are available for an account associated with the payment transaction. The grace period is longer than the standard clearing and settlement time period. For example, issuer decisioning platform 2040 communicates with PNIP 2024 indicating an IOU approval. The IOU indication in the ISO 8583 MTI 0110 could be an IOU flag in DE 39, for example.

In at least some instances, the dispatching step is responsive to determining that required funds are not currently available for the account associated with the payment transaction. For example, platform 2040 compares the amount requested in the authorization request to the corresponding available balance or open to buy balance for the account.

In some cases, the payment network is a payment card network (2008 is a non-limiting example), the payment transaction is a payment card transaction, and the account is a payment card account; and the steps of enrolling, obtaining, and dispatching are carried out at a payment card issuer (e.g., 2010), interfacing with the payment card network (e.g. 2008). The payment card issuer issued the payment card account in question.

In some embodiments, the enrolling of the plurality of account holders includes obtaining, from each of the plurality of cardholders, payroll details (see, e.g., step 404); and obtaining, from each of the plurality of account holders, a request to utilize the grace period billing program for at least one of the plurality of billers (see, e.g., step 406). For example, cardholders can interface with the database 2041 of the issuer decisioning platform 2040 via an enrollment user interface, to store the payroll details and the identity of the biller that is to receive special treatment. Exemplary user interfaces are discussed elsewhere herein.

In at least some cases, a further step includes, during the enrollment, obtaining agreement to the grace period. Optionally, the grace period is timed to coincide with a payday of the given one of the cardholders.

In some cases, an additional step includes, during the enrollment, enrolling at least some of the plurality of account holders in an electronic billing program.

In some instances, a further step includes, prior to dispatching the special IOU approval authorization request response, verifying that trust conditions still apply to a given one of the account holders associated with the payment card transaction. For example, the issuer 2010 checks with the payroll program before sending the special IOU approval authorization request response, or, more generally, checks for continuing trust in the account holder. For example, platform 2040 may be provided with a suitable network connection to the payroll program, credit rating agency, or the like.

Furthermore, given the discussion thus far, and with continued reference to FIGS. 3, 4 and 6-10, it will be appreciated that, in general terms, still another exemplary method, according to still another aspect of the disclosure, includes the step of enrolling a plurality of billers (e.g., 2004) in a grace period billing program. For example, acquirer 2006 adds the enrolled billers to database 2021. A further step includes obtaining, via a payment card network (2008 is a non-limiting example), a special IOU approval authorization request response (ISO 8583 MTI 0110 is a non-limiting example) to an authorization request for a payment card transaction, indicating that a given one of the plurality of billers will be paid in connection with the payment transaction after expiration of a first grace period from the time of the authorization request, regardless of whether funds are available for an account associated with the payment transaction. The grace period is longer than the standard clearing and settlement time period for the payment card network. For example, acquirer platform 2015 obtains the authorization request response via PNIP 2012. A further step includes passing the IOU approval authorization request response to the given one of the plurality of billers (e.g., platform 2015 communicates with the appropriate terminal via driver 2014).

In some such instances, further steps include obtaining, via the payment card network, another special IOU approval authorization request response to an authorization request for another payment transaction, indicating that a biller not among the plurality of enrolled billers will be paid in connection with the other payment transaction after expiration of a second grace period (in general, can be the same or different than the first) from the time of the other authorization request, regardless of whether funds are available for another account associated with the other payment transaction. Responsive to the other special IOU approval authorization request response being associated with the biller that is not among the plurality of enrolled billers, a further step includes sending a decline to the biller who is not among the plurality of enrolled billers (e.g., platform 2015 communicates with the appropriate terminal via driver 2014) and a reversal back to an issuer associated with the other payment card transaction (e.g., platform 2015 communicates with the issuer via PNIP 2012 as an edge of network 2008).

As noted, in an alternative approach, the acquirer refrains from dispatching a clearing and settlement message for the payment card transaction into the payment card network until expiration of the first grace period. For example, platform 2014 flags the transaction and keeps it in an acquirer hold queue (not shown) coupled to platform 2015.

Where the acquirer does not refrain from dispatching the clearing and settlement message (e.g., first exemplary alternative discussed above), the clearing message dispatched can be, for example, an ISO 8583 message type indicator 1240 with data element 24 function code value 200 and a private data sub-element IOU flag.

For enrollment steps, in a non-limiting example, parties to enroll can interface with a database management system managing the pertinent database via an enrollment user interface. Non-limiting examples of database programs and user interfaces are set forth elsewhere herein.

In another aspect, a payment card network (2008 is a non-limiting example) has a standard clearing and settlement time period. The payment card network includes an acquirer payment card network interface (PNIP 2012 is a non-limiting example) configured to obtain, from a given one of a plurality of billers (e.g., 2004), an authorization request (e.g., ISO 8583 MTI 0100) for a payment card transaction. The payment card network also includes an issuer payment card network interface (PNIP 2024 is a non-limiting example) configured to obtain from a corresponding issuer (e.g., 2010), a special IOU approval authorization request response to the authorization request for the payment card transaction, indicating that the given one of the plurality of billers will be paid in connection with the payment card transaction after expiration of a grace period from a time of the authorization request, regardless of whether funds are available for an account associated with the payment card transaction. The grace period is longer than the standard clearing and settlement time period. The special IOU approval authorization request response could be, for example, an ISO 8583 MTI 0110 with an IOU flag in DE 39. The payment card network includes a clearing and settlement system (e.g., 2074) coupled to the acquirer payment card network interface and the issuer payment card network interface. The clearing and settlement system includes a hold queue (e.g., 2076) which holds the payment card transaction so that the payment card transaction does not settle until expiration of the grace period.

System and Article of Manufacture Details

Embodiments of the disclosure can employ hardware and/or hardware and software aspects. Software includes, but is not limited to, firmware, resident software, microcode, etc. Software might be employed, for example, in connection with one or more of terminal driver 2014; acquirer processing platform 2015; PNIP 2012; issuer decisioning platform 2040; PNIP 2024; mainframe 2052; MPS 2018; GFT 2059; ASPs 2050; communications layer 2056; services 2051; clearing and settlement system 2074; interface 2068 to other payment card networks; a terminal 122, 124, 125, 126; a reader module 132; a host, server, and/or processing center 140, 142, 144 (optionally with data warehouse 154) of a merchant, issuer, acquirer, processor, or operator of a payment network 2008, operating according to a payment system standard (and/or specification); and the like. Firmware might be employed, for example, in connection with payment devices such as cards 102, 112, as well as reader module 132.

Figure 5:
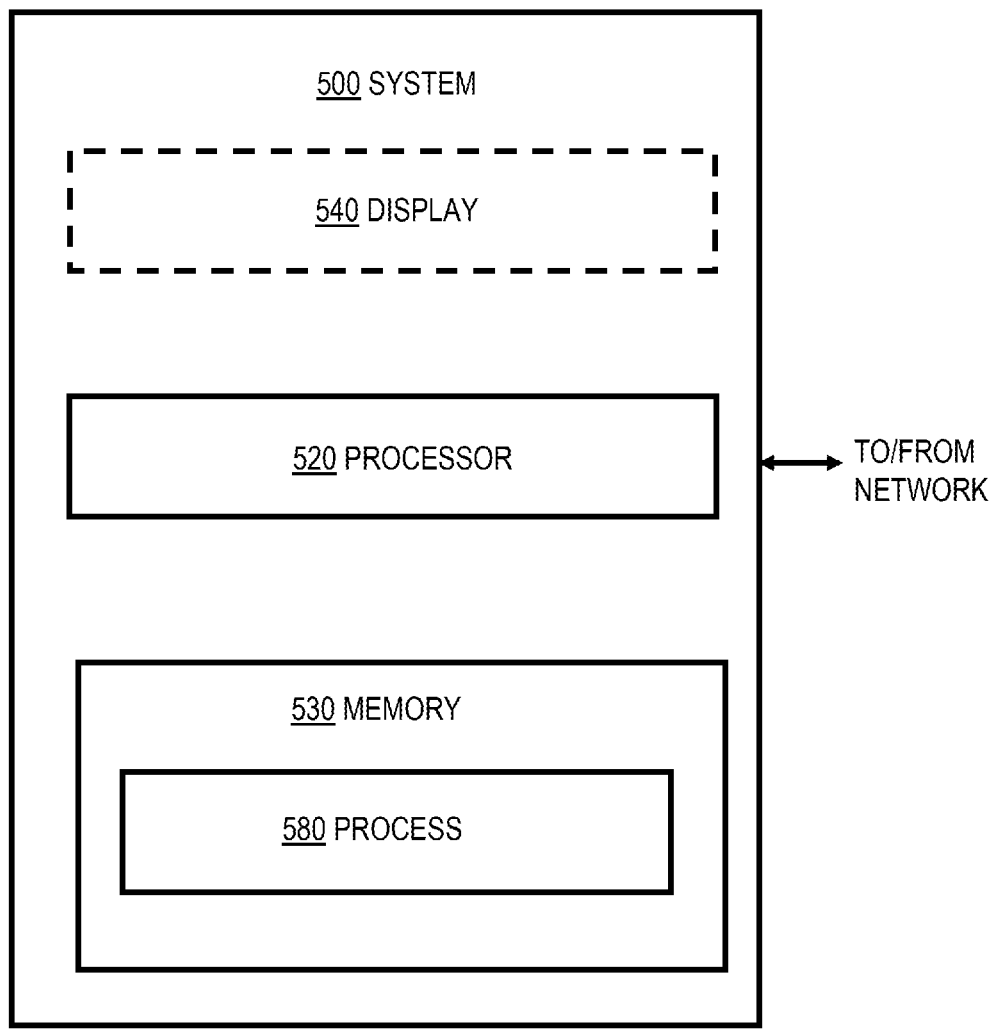
FIG. 5 is a block diagram of an exemplary computer system useful in one or more embodiments of the disclosure.

FIG. 5 is a block diagram of a system 500 that can implement part or all of one or more aspects or processes of the disclosure. As shown in FIG. 5, memory 530 configures the processor 520 (which could correspond, e.g., to processor portions 106, 116, 130; a processor of a terminal or a reader module 132; processors of remote hosts in centers 140, 142, 144; processors of hosts and/or servers implementing various functionality such as that in FIGS. 6-10; and the like); to implement one or more aspects of the methods, steps, and functions disclosed herein (collectively, shown as process 580 in FIG. 5). Different method steps can be performed by different processors. The memory 530 could be distributed or local and the processor 520 could be distributed or singular. The memory 530 could be implemented as an electrical, magnetic or optical memory, or any combination of these or other types of storage devices (including memory portions as described above with respect to cards 102, 112). It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an application-specific integrated circuit (ASIC) or field-programmable gate array (FPGA) rather than using firmware. Display 540 is representative of a variety of possible input/output devices (e.g., displays, printers, keyboards, mice, touch pads, and so on).

System 500 is generally representative of a server implementing various functionality such as that in FIGS. 6-10 and a client device accessing same, for example.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; 2014; 2015; 2012; 2040; 2024; 2052; 2018; 2059; 2050; 2056; 2051; 2074; 2068; on a computer implementing platforms or other functionality; on a server or one or more clients interfacing with same; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the disclosure, such as, for example, 122, 124, 125, 126, 140, 142, 144, 2004, 2006, 2008, 2010; 2014; 2015; 2012; 2040; 2024; 2052; 2018; 2059; 2050; 2056; 2051; 2074; 2068; a computer implementing platforms or other functionality; on a server or one or more clients interfacing with same; and the like, can make use of computer technology with appropriate instructions to implement method steps described herein. Some aspects can be implemented, for example, using one or more servers that include a memory and at least one processor coupled to the memory. The memory could load appropriate software. The processor can be operative to perform one or more method steps described herein or otherwise facilitate their performance.

Accordingly, it will be appreciated that one or more embodiments of the disclosure can include a computer program product comprising computer program code means adapted to perform one or all of the steps of any methods or claims set forth herein when such program is run on a computer, and that such program may be embodied on a computer readable medium. Further, one or more embodiments of the present disclosure can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 5) running a server program. It will be understood that such a physical server may or may not include a display, keyboard, or other input/output components. A "host" includes a physical data processing system (for example, system 500 as shown in FIG. 5) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include terminal driver module implementing at least a portion of terminal driver 2014; an acquirer processing platform module implementing acquirer processing platform 2015; modules and/or submodules implementing the functionality described with respect to PNIPs 2012, 2024 and ASPs 2050; an issuer decisioning platform implementing issuer decisioning platform 2040; modules and/or submodules implementing the functionality described with respect to mainframe 2052, MPS 2018, GFT 2059, communications layer 2056, services 2051, clearing and settlement system 2074, and interface 2068 to other payment card networks; and the like. Databases can be stored in non-volatile (persistent) memory such as a hard drive or drives and accessed by a suitable database management system. Input and output can be provided via a suitable user interface (UI). The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

One example of a user interface module to implement an enrollment (or other) UI is hypertext markup language (HTML) code served out by a server, to a browser of a computing device of a user. The HTML is parsed by the browser on the user's computing device to create a graphical user interface (GUI). In some cases, a service may be operated for another entity rather than an end user and a UI involves an API or the like that provides the other entity with access to the database; the end user in such cases may interact, for example, with a GUI provided by the other entity.

Computers discussed herein can be interconnected, for example, by one or more of network 138, 2008, another virtual private network (VPN), the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as Neo4j, an open-source graph database or similar graph database, relational database applications (e.g., IBM DB2® software available from International Business Machines Corporation, Armonk, N.Y., US; SAS® software available from SAS Institute, Inc., Cary, N.C., US), spreadsheets (e.g., MICROSOFT EXCEL® software available from Microsoft Corporation, Redmond, Wash., US), and the like. SQL or Structured Query Language is a special-purpose programming language designed for managing data held in a relational database management system (RDMS). SQL and RDMS are non-limiting examples of suitable query techniques and database management systems, respectively. The computers can be programmed to implement the logic and/or data flow depicted in the figures. In some instances, messaging and the like may be in accordance with ISO Specification 8583 Financial transaction card originated messages—Interchange message specifications and/or the ISO 20022 or UNIFI Standard for Financial Services Messaging, also incorporated herein by reference in its entirety for all purposes.

Although illustrative embodiments have been described herein with reference to the accompanying drawings, it is to be understood that those precise embodiments are non-limiting, and that various other changes and modifications may be made by one skilled in the art without departing from the scope or spirit of the disclosure.

What is claimed is:

1. A method comprising the steps of:
   obtaining, from a given one of a plurality of billers, over a payment network having a first clearing and settlement time period, an authorization request for a payment transaction, wherein said payment network comprises a payment card network and said payment transaction comprises a payment card transaction;
   passing, via said payment network, an IOU approval authorization request response to said authorization request for said payment card transaction, said IOU approval authorization request indicating that said given one of said plurality of billers will be paid in connection with said payment card transaction after expiration of a grace period from a time of said authorization request, regardless of whether funds are available for an account associated with said payment card transaction, said grace period being longer than said first clearing and settlement time period;
   refraining from clearing and settling said payment card transaction until expiration of said grace period; and
   obtaining, via said payment card network, a clearing message indicating that said payment card transaction is to be cleared and settled in accordance with terms of said IOU approval authorization request, wherein said refraining is responsive to said clearing message;
   wherein:
   said step of refraining from clearing and settling is carried out at an intermediate node in said payment card network;
   said step of passing said IOU approval authorization request response comprises obtaining said response from an issuer of a payment card associated with said payment card transaction;
   said payment card network comprises an ISO 8583 payment card network and wherein, in said step of obtaining said clearing message, said clearing message comprises an ISO 8583 message type indicator 1240 with data element 24 function code value 200 and a private data sub-element IOU flag; and
   said refraining comprises placing said payment card transaction in a hold queue of a clearing and settlement system.

2. The method of claim 1, wherein, in said step of obtaining, from said issuer of said payment card, said IOU approval authorization request, said payment card comprises a prepaid payment card.

3. A method comprising the steps of:
   obtaining, from a given one of a plurality of billers, over a payment network having a first clearing and settlement time period, an authorization request for a payment transaction, wherein said payment network comprises a payment card network and said payment transaction comprises a payment card transaction;
   passing, via said payment network, an IOU approval authorization request response to said authorization request for said payment card transaction, said IOU approval authorization request indicating that said given one of said plurality of billers will be paid in connection with said payment card transaction after expiration of a grace period from a time of said authorization request, regardless of whether funds are available for an account associated with said payment card transaction, said grace period being longer than said first clearing and settlement time period;
   refraining from clearing and settling said payment card transaction until expiration of said grace period; and
   obtaining, via said payment card network, a clearing message indicating that said payment card transaction is to be cleared and settled in accordance with terms of said IOU approval authorization request, wherein said refraining is responsive to said clearing message;
   wherein:
   said step of refraining from clearing and settling is carried out at an intermediate node in said payment card network;
   said step of passing said IOU approval authorization request response comprises obtaining said response from an issuer of a payment card associated with said payment card transaction; and
   said payment card network comprises an ISO 8583 payment card network and wherein, in said step of obtaining said clearing message, said clearing message comprises an ISO 8583 message type indicator 1240 with data element 24 function code value 200 and a private data sub-element IOU flag;
   further comprising:
   storing an identifier of said payment card transaction in a database in response to said obtaining, via said payment card network, of said IOU approval authorization request response, wherein said refraining is responsive to said identifier of said payment card transaction being found in said database when said clearing message is obtained.

4. A payment card network having a first clearing and settlement time period, said payment card network comprising:
   an acquirer payment card network interface configured to obtain, from a given one of a plurality of billers, an authorization request for a payment transaction, wherein said payment network comprises said payment card network and said payment transaction comprises a payment card transaction;
   an issuer payment card network interface configured to obtain from a corresponding issuer of a payment card associated with said payment card transaction, an IOU approval authorization request response to said authorization request for said payment card transaction, indicating that said given one of said plurality of billers will be paid in connection with said payment card transaction after expiration of a grace period from a time of said authorization request, regardless of whether funds are available for an account associated with said payment card transaction, said grace period being longer than said first clearing and settlement time period; and a clearing and settlement system, located at an intermediate node in said payment card network, said payment card network comprising an ISO 8583 payment card network, said clearing and settlement system being coupled to said acquirer payment card network interface and said issuer payment card network interface, said clearing and settlement system comprising a hold queue which holds said payment card transaction so that said payment card transaction does not settle until expiration of said grace period, said clearing and settlement system configured to obtain, via said payment card network, a clearing message comprising an ISO 8583 message type indicator 1240 with data element 24 function code value 200 and a private data sub-element IOU flag, and indicating that said payment card transaction is to be cleared and settled in accordance with terms of said IOU approval authorization request, wherein said refraining is responsive to said clearing message.

\* \* \* \* \*